(12) United States Patent
Lennartsson

(10) Patent No.: US 7,503,359 B2
(45) Date of Patent: Mar. 17, 2009

(54) HARVESTER FOR A FORESTRY MACHINE

(75) Inventor: Christer Lennartsson, Vislanda (SE)

(73) Assignee: Fiberpac KB, Vittaryd (SE)

( * ) Notice: Subject to any disclaimer, the term of this patent is extended or adjusted under 35 U.S.C. 154(b) by 0 days.

(21) Appl. No.: 10/578,169

(22) PCT Filed: Oct. 21, 2004

(86) PCT No.: PCT/SE2004/001520

§ 371 (c)(1),
(2), (4) Date: Mar. 12, 2007

(87) PCT Pub. No.: WO2005/043983

PCT Pub. Date: May 19, 2005

(65) Prior Publication Data

US 2007/0251600 A1    Nov. 1, 2007

(30) Foreign Application Priority Data

Nov. 6, 2003    (SE) ............................. 0302936

(51) Int. Cl.
*B23Q 16/00*    (2006.01)
(52) U.S. Cl. .................. 144/394; 144/404; 144/4.1; 144/34.1; 144/24.13; 144/208.1
(58) Field of Classification Search ............... 144/391, 144/392, 394, 402–404, 4.1, 34.1, 24.13, 144/208.4, 208.5
See application file for complete search history.

(56) References Cited

U.S. PATENT DOCUMENTS

| 4,250,935 A | * | 2/1981 | Helgesson et al. .......... 144/343 |
| 4,898,218 A | | 2/1990 | Linderholm |
| 5,832,975 A | | 11/1998 | Hamby |
| 6,318,425 B1 | | 11/2001 | Niemi |

FOREIGN PATENT DOCUMENTS

| GB | 2 257 512 | 1/1993 |
| WO | WO0245482 | 6/2002 |

* cited by examiner

*Primary Examiner*—Shelley Self
(74) *Attorney, Agent, or Firm*—Bachman & LaPointe, P.C.

(57) ABSTRACT

A harvester for a forestry machine comprises grapples, a cutting device, trimming devices, and advancement devices for grasping, cutting, trimming, and advancement in the axial direction, respectively of a tree stem. Further, the harvester includes a measurement device for measuring the length of the tree stem and a measurement device for measuring how the transverse dimension of the tree stem varies along its length. The measurement device includes a movable measurement device for contact-free detection of the outer contour of the tree stem, from which the diameter is calculable. The measurement device is located between the trimming device and the advancement device for counteracting dirtying of the measurement device. A method for measuring the transverse dimension of a tree stem is disclosed.

9 Claims, 3 Drawing Sheets

HARVESTER FOR A FORESTRY MACHINE

BACKGROUND

(1) Field of the Invention

The present invention relates to a harvester for a forestry machine, comprising grapple means for grasping a tree stem, a cutting tool for cutting off the tree stem, a limbing or trimming device for trimming the tree stem, advancement means for advancing the tree stem in the axial direction past the trimming device and the cutting tool, a measurement device for measuring the length of the tree stem and a measurement device for measuring how the transverse dimension of the tree stem varies along its length, this measurement device including movable measurement means for contact-free detection of the outer contour of the tree stem, from which its diameter is calculable.

The present invention further relates to a method of measuring the transverse dimension of a tree stem in connection with felling thereof, the tree stem being moved axially past a measurement device in a harvester, comprising the steps that a pair of measurement means are moved towards the tree stem, that pairs of read-off values are registered on detection of the outer contour of the tree stem, and that the transverse dimension of the tree stem is calculated from each pair of read-off values.

(2) Prior Art

In the felling of forest in modern, rational forestry, it is extremely important to monitor dimensions and volumes of those trees that a felled, in order that correct deliveries can be made to sawmills, pulp industries and other recipients of the felled trees. In such instance, the outer contour of the tree stems is sensed in at least two points lying in register with each other, and the distance between the points gives an approximation of the diameter of the tree stem. Granted, it may happen that a tree stem is oval and, in such instance, a measurement is taken of its minor axis which is considerably shorter than its major axis, but in the measurement of a large number of tree stems, the random variation of the measured transverse dimensions will on average give an acceptable sum total of the calculated volumes.

Today, the measurement of the extent of the tree stem is often put into effect using the knives disposed on the forestry machine for the trimming operation which wholly or partly surround the felled tree stem. The measurement using the knives is imprecise, since the knives cannot follow any possible inward depressions in the tree stem, but adjust themselves in response to the most projecting area of the stem. There are always larger or smaller air pockets inside the knives which in themselves are rigid.

Another method that has been tried is to dispose on the machine a frame with fixed photocells in a large number of positions. Depending on whether the light to the photocells is broken or not, the outer contour of the tree stem can be detected. One problem inherent in such frames is that they are sensitive to disturbance, since they contain many photocells which must all function in order to obtain a correct result. Another difficulty inherent in photocell frames is that they are sensitive to dirt, bark, branches, gravel and the like. Finally, such constructions are expensive to manufacture and maintain.

Those apparatuses with movable measurement means which are available, for example for measuring complex tubular structures and the like are thus far too fragile and expensive to be practically usable in a forestry machine.

There is thus a need in the art to realise a harvester with a measurement device which is sufficiently robust to function under the conditions prevailing at the felling site with the sought-for accuracy.

SUMMARY OF THE INVENTION

The object forming the basis of the present invention will be attained if the harvester intimated by way of introduction is given the characterising feature that the measurement device is located between the trimming device and the advancement means for counteracting dirtying of the measurement device.

Regarding, the method, the object of the present invention will be attained if it is characterised in that, after detection of the outer contour, the measurement means are moved a distance away from the tree stem in order thereafter once again to be moved towards the tree stem for a renewed detection of the outer contour, and that a read-off value which exceeds the previous read-off value is replaced by the previous value before a renewed calculation of the transverse dimension.

Further advantages will be attained if the harvester according to the present invention is in addition given one or more of the characterising features as set forth in appended claims 2 to 7 and if the method is given any one or more of the characterising features as set forth in appended claims 9 to 12.

BRIEF DESCRIPTION OF THE DRAWINGS

The present invention will now be described in greater detail hereinbelow, with reference to the accompanying Drawings.

In the accompanying Drawings.

DETAILED DESCRIPTION OF THE PREFERRED EMBODIMENT(S)

Forestry machines are typically employed in quite severe terrain in order to reach the trees that are to be felled. The felling operation takes place rapidly, and for maximum efficiency the felled trees are loaded direct onto a transport vehicle and cut at the same time into suitable lengths. As was mentioned by way of introduction, it is desirable to provide a simultaneous measurement of the felled tree stems so that the volume that has been felled is known immediately. Different thicknesses of the tree stems may also entail that different lengths of the cut sections of the tree are desirable.

In the preferred embodiment, a harvester is disposed on a forestry machine which is designed so that a so-called "single grapple" is realised. The term "single grapple" is taken to signify such a forestry machine as only grasps the tree stem that is to be felled once, and does not release it until it is felled, trimmed and cut into suitable lengths. At the same time, measurement also takes place of the felled tree stem. In broad outline, the felling process is as follows: the harvester is steered up to the tree and is oriented so that it can grasp around the tree. When the harvester has approached so closely to the tree that it surrounds it, its grappling tool grasps around the tree. In this position, the tree is cut and thereafter lifted up and oriented so that it is approximately horizontal. Hereafter, the tree stem is fed through the harvester and a simultaneous trimming of branches and measurement of the length of the stem take place. When a suitable length of the tree stem has been fed through the harvester, it is cut so that shorter timber lengths are obtained. On the cutting operation, the forestry machine with the harvester is possibly located beside a load vehicle, so that the cut sections of the tree stem is placed direct on the load vehicle, but the cut sections may also be placed on the ground for later removal.

Figure 1:
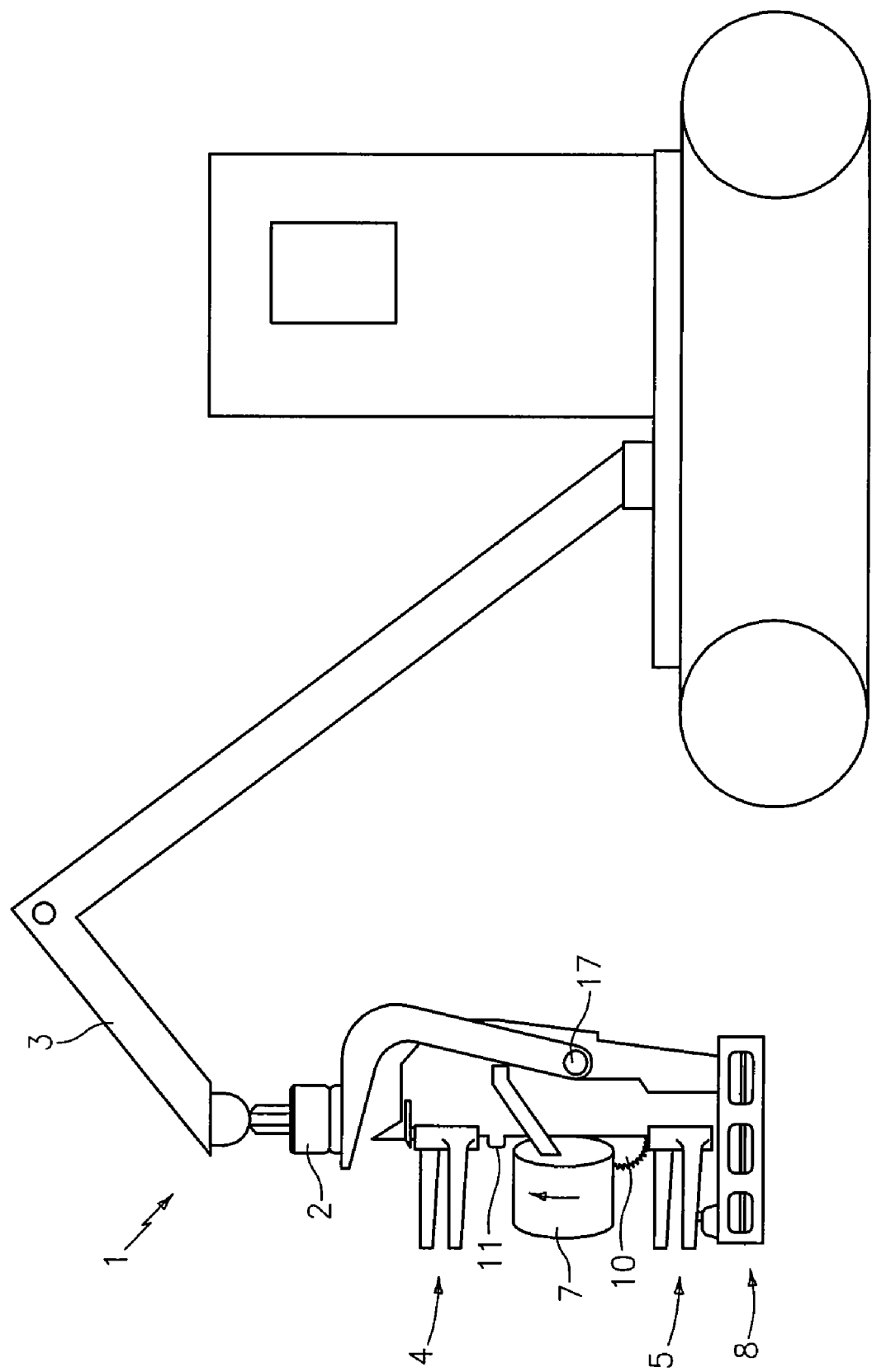
FIG. 1 is a straight side elevation of a forestry machine including a harvester according to the present invention.

FIG. 1 shows in schematic view the placing of a harvester 1 on a forestry machine. There are many different types of forestry machines and it could even be conceivable that the harvester could be placed on an excavator.

The harvester 1 is typically disposed in the end of a long boom 3 whose other end is disposed on the vehicle. The boom 3 is movable within broad limits both vertically, laterally and in depth for maximum access to the trees that are to be felled.

FIG. 1 shows a harvester 1 according to the invention. In the specification below, use is made of terms such as upper, lower, upwards and downwards. The directions and positions relate to FIG. 1 and do not necessarily agree with the orientation of the harvester when in operation. The harvester 1 is disposed via a rotator 2 on a boom 3, which in its turn is disposed on the forestry machine. The rotator 2 makes for rotation of the entire harvester 1 about is longitudinal axis in relation to the boom 3. The harvester 1 may also be angled around a shaft 17 and is lockable in any optional position so that it may be oriented together with a felled tree stem to the desired position, preferably horizontal before trimming and cutting. On the harvester 1, there are upper and lower grapples 4 and 5. The grapples 4 and 5 are shown in FIG. 1 in their open position, i.e. they are located in that position where they are ready to grasp around a tree stem. Seen from above, i.e. in the direction of the arrow A, the grapples display substantially semi-circular cross section inside which a tree stem may be accommodated. On the edges of the grapples 4 and 5 are disposed sharp cutting edges 6 so that they simultaneously function as trimming devices for a tree stem that moves past the grapples-in that it is driven forwards. In the preferred embodiment, a tree stem moves in the direction A, for which reason the edges 6 in this embodiment need only be disposed on the upper edges of the grapples 4, 5 in the Figure. Between the upper grapple 4 and the lower grapple 5 there are disposed two advancement means 7 in the form of chain-clad wheels. At the same time as the upper and lower grapples 4 and 5 grasp the tree stem, the advancement means 7 are also guided towards the tree stem for abutment against it and contribute in the grip around the stem. The wheels 7 are rotary and when they are rotated in the direction illustrated in FIGS. 1 and 2, the tree stem will be driven in a direction downwards in the Figure. This makes possible trimming of branches with the aid of the trimming devices 6.

Lowermost on the harvester 1 there is disposed a cutting device 8, preferably in the form of a saw blade with a saw chain. The cutting device 8 is pivotal about an axis 9 so that it is movable reciprocally for cutting the tree stem that is held fast by the grapples 4 and 5.

For measuring the length of the advanced, felled tree stem, a measurement wheel 10 is disposed on the harvester 1. The measurement wheel 10 automatically comes into contact with the tree stem when this is grasped by the grapples 4 and 5 and urged towards the harvester 1. Preferably, the measurement wheel 10 is resiliently sprung for optimum contact with the tree stem.

Figure 2:
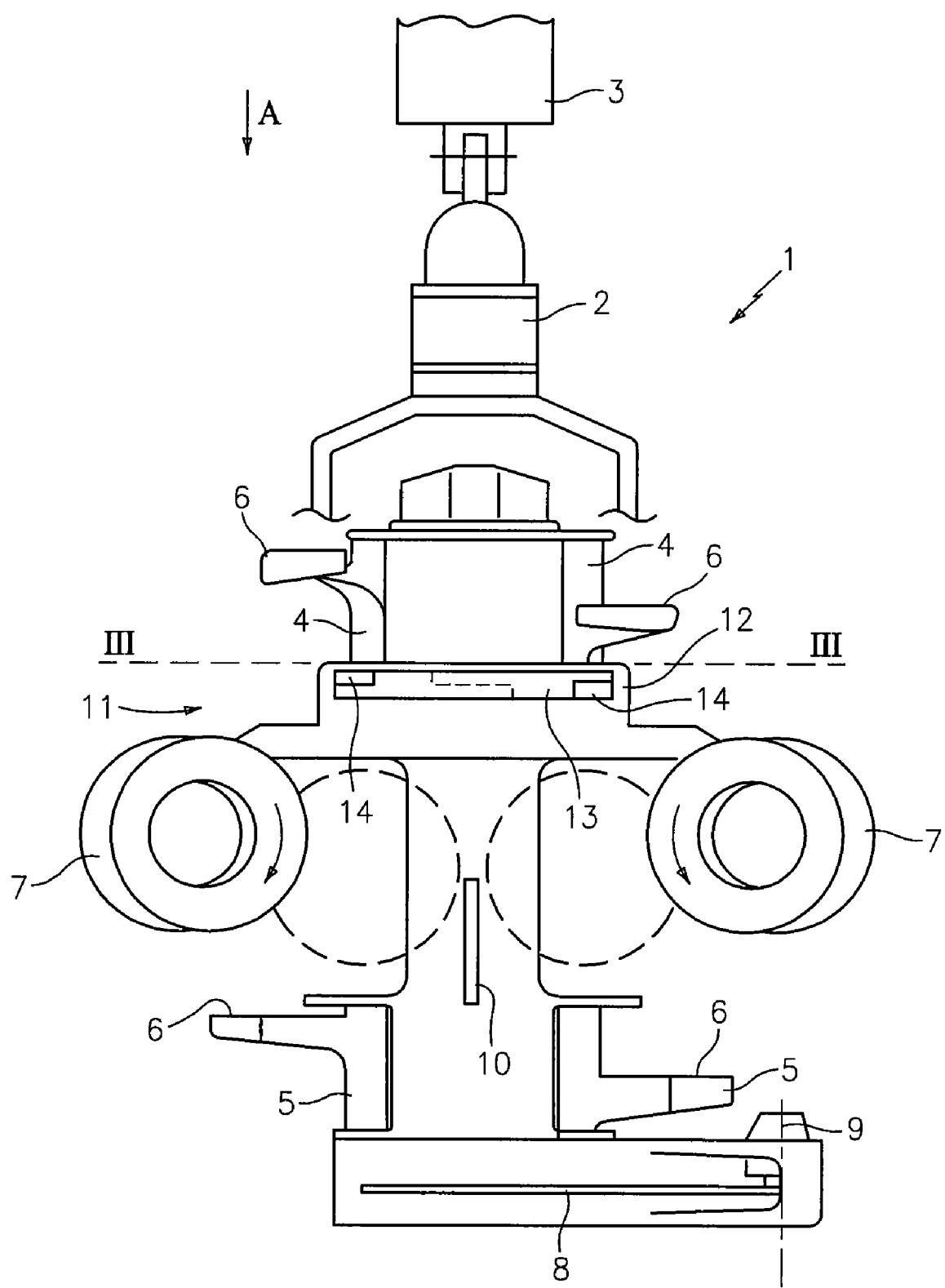
FIG. 2 is a view from the left of the harvester according to FIG. 1.

For measuring the diameter of the felled tree stem, there is provided a measurement device 11 between the upper grapple 4 and the advancement means 7. This implies that the measurement device 11 is relatively protected from dirt and other foreign matter since particles that are torn loose by the advancement means 7 primarily move downwards in FIG. 2, i.e. in the working position substantially horizontally away from the measurement device, while those branches and bark that are removed by the trimming device 6 on the upper grapple principally move upwards in the Figure, primarily because the tree stem is substantially horizontally oriented during advancement and trimming. The measurement device 11 has an outer casing 12 which is preferably manufactured from sheet metal or metal in some other form. On its side facing towards the tree stem, the outer casing 12 has a gap or slot 13 for a free line of sight between the interior of the device and the tree stem. In FIG. 2, the slot 13 is quite wide and it is conceivable to make the slot narrower in order further to protect the measurement device 11. In FIG. 2, the movable photocells 14 disposed in the outer casing 12 can been seen through the slot 13. Since the slot 13 is located above the tree stem during the trimming operation, the risk is avoided that bark, branches and dirt penetrate into the measurement device 11.

Figure 3:
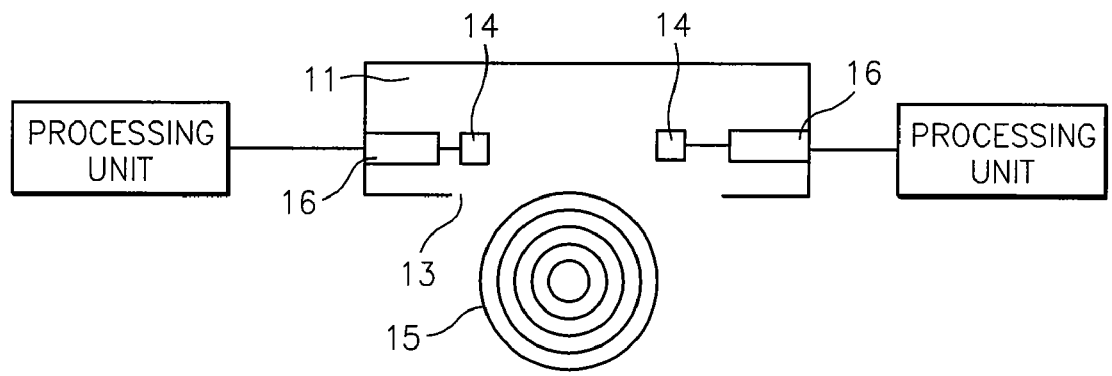
FIG. 3 is a view of the measurement device included in the harvester taken along the section line III-III in FIG. 2.

FIG. 3 is a view straight from above of a section through the measurement device 11 taken along the line III-III. As was mentioned above, the outer casing 12 and the two movable photocells 14 are included in the measurement device 11. In register with a felled tree stem 15, the slot 13 is disposed in the outer casing 12.

The photocells 14 are each disposed on either side of the measurement device 11. The photocells 14 are reciprocally movable, i.e. towards and away from the outer sides of the stem within quite a large range, which for each one of the photocells 14 comprises the region from the side of the measurement device 11 up to its centre. The photocells 14 are movable transversely of the longitudinal direction of the stem, preferably at right angles thereto. As a result, it is possible to cove the entire measurement region in that either of the photocells 14, and in certain areas both of them, are movable in the measurement region. For the photocells 14 to be movable, they are disposed on actuators 16 which, in the preferred embodiment, are hydraulic piston and cylinder assemblies.

The photocells 14 have a transmitting and a receiving device disposed adjacent one another. The transmitting device transmits a light beam in the visible or invisible wavelength range. When the beam impinges on an object, i.e. in this practical application the tree stem, it is reflected and caught up by the receiving device. Each photocell 14 has a regulator in the form of a potentiometer for affecting the current strength to the photocell. The current strength determines the intensity of the beam which in turn governs the range of the photocell. Objects that are located beyond the range of the beam are not detected and it is therefore possible to cause the slot 13 to be turned to face downwards in use of the harvester, without the photocells 14 being affected by the ground below, which is outside their range.

In order to ensure that the photocells 14 do not collide when both of them move inwards, they are disposed a short distance from each other in the longitudinal direction of the tree stem (i.e. at right angles to the plane of the paper in FIG. 2) and it is therefore possible to cause their movement ranges to overlap one another a short distance, in order to ensure that the whole of the measurement region is covered. Even if the measurement means in the form of photocells 14 do not lie exactly in register with one another, they are nevertheless adjusted by rotation so that their emitted beams are substantially parallel with one another, such that the tree stem 15 is measured at two registering points when determining its diameter.

The photocells 14 and their actuators 16 are connected to a processing unit for controlling them. The processing unit, which is not shown, is operative to guide each respective measurement means 14 towards the tree stem 15. On an indication from the measurement means 14, in the preferred embodiment a photocell, that it is located at the side of the tree stem 15, the processing unit will receive a corresponding indication and is operative to calculate the diameter of the tree stem 15, and also operative to guide the measurement means 14 away from the tree stem 15. The processing unit is further operative to repeat the just described measurement, for obtaining a new measurement value for the outer side of the tree stem 15 when it has moved a short distance forwards, from which the diameter of the stem is once again calculable.

On measuring a just felled tree stem 15, the measurement begins at or in the proximity of the thicker end of the stem, since the measurement device 11 is located quite close to the cutting device 8. Possibly, the tree stem 15 can, after the cutting device 8, be reversed a distance, so that the measurement begins as close to the end as possible. When the measurement begins, the measurement means 14 start their first movement towards the tree stem 15. As soon as their light beams are reflected by the tree stem 15, i.e. when its surface has been detected, signal is transmitted to the processor unit which, in such instance, registers the positions of the measurement means 14, possibly by reading-off the state of the actuators 16. Thereafter, the photocells 14 move outwards in order to return for a renewed measurement when the tree stem has moved a short distance forwards, in a new measurement point. The distance between the measurement points is determined, on the one hand by how quickly the photocells 14 reciprocate and, on the other hand, how quickly the tree stem 15 moves in the axial direction past the slot 13 of the measurement device 11.

Since the felled tree stem 15 moves past the slot 13 with its thickest end first, and in a tapering direction, the measured positions of the contour of the tree stem 15 will progressively reduce in a typical case. It will readily be perceived that a tree stem 15 often displays irregularities in the form of projections from incompletely cut branches or bends and depressions. The processing unit is therefore rehearsed so that a detected measurement value that exceeds the last stored value is not accepted but is replaced by the latest value. In the subsequent measurement, a new comparison is made with the last stored value. If the new value still exceeds this, this value is also replaced by the stored value. Not until a measurement value which is equal to or less than the stored value is received will the measured value be registered. By such means, that part of the tree stem 15 which projects out beyond its actual contour will be ignored. The volume will therefore not be overestimated. On the contrary, a certain underestimated of the volume takes place, but the industry is more than inclined to accept this.

Figure 4:
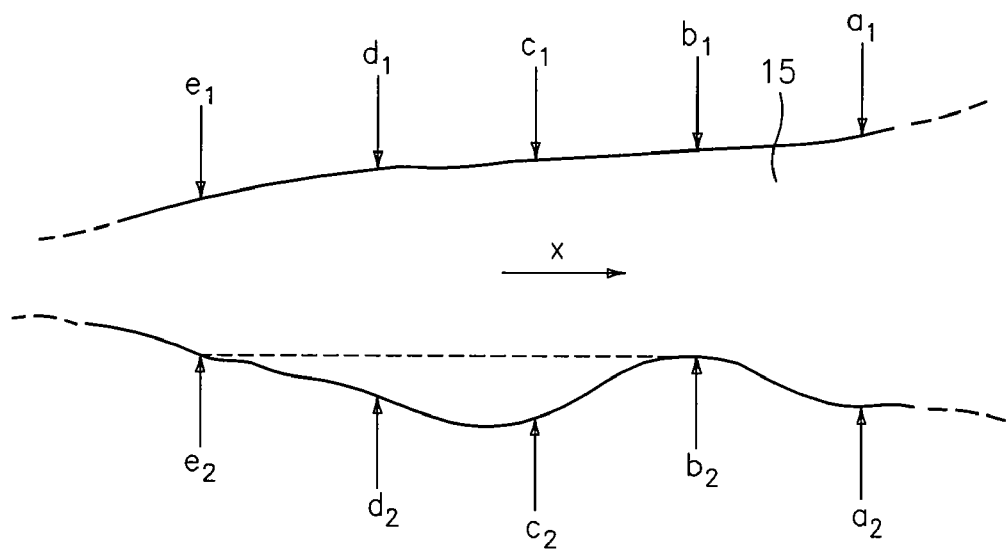
FIG. 4 is a straight side elevation of a tree stem that passes the measurement device and on which a series of measurement points are sketched.

FIG. 4 shows one example where a plurality of measurements has been conducted on a felled tree stem 15. The tree stem 15 moves past the measurement device 11 in the direction of the arrow X. A large number of measurement values are obtained and we will now consider more closely some of them.

The values corresponding to one another $a_1$ and $a_2$ are obtained close to the larger end of the tree stem 15. On a continued measurement a distance downwards, there will be obtained the values $b_1$ and $b_2$. $b_1$ is less than $a_1$ and $b_2$ is less than $a_2$ and an approximative diameter can once again be calculated in this position. The values $c_1$ and $c_2$ are obtained in the immediately subsequent measurement. Granted $c_1$ is less than $b_1$ and will therefore be registered, but $c_2$ is larger than $b_2$ and will therefore be rejected and replaced by $b_2$. The transverse dimension measured at the position of $c_1$ and $c_2$ will be calculated on the basis of the values $c_1$ and $b_2$. A slightly narrower approximative diameter than in reality will thus be calculated. The values $d_1$ and $d_2$ are measured in the same manner as previously, and also in this case, the value $d_1$ is less than the preceding value $c_1$. The value $d_2$ is still larger than the earlier value $b_2$ and will therefore be rejected and be replaced by the previously stored value $b_2$. The calculated outer contour is thus equal to $b_2$, which corresponds to the broken line in the Figure, and an approximative diameter which is less than the actual diameter will be calculated from $d_1$ and $b_2$. Only at the measurement of points $e_1$ and $e_2$ will the saved value $b_2$ be replaced by $e_2$, since this is equal to or less than $b_2$. Here, the calculated diameter corresponds to the actual diameter. In this instance, w see a practical example that irregularities in the tree stem do not result in an overestimation of its volume with the calculation algorithm entered in the processing unit.

In the preferred embodiment, it was disclosed that the measurement means 14 are typically movable photocells. These are adjustable to function within a certain range and this range is suitably the range where the measured tree stem 15 may be expected to be located. Thus, objects a distance beyond the felled tree stem 15 will not affect the photocells 14. Correspondingly, other measurement means with corresponding properties may also be used. A few examples of such measurement means are ultrasound devices or microwave devices.

Another method of modifying the present invention is that parts of the harvester 1 are replaced by previously known such parts, but the inventive concept as herein disclosed which encompasses the design the measurement device 11 is retained as well as its positioning between the advancement means 7 and the other trimming devices 6, for minimising dirtying the measurement means 14.

The actuators 16 may alternatively comprise electric switches, pneumatic cylinders or linear motors. The crucial feature is that they are capable of affecting the movement of the measurement means 14 with a simultaneous indication of the position to the processing unit.

The present invention may be modified further without departing from the scope of the appended Claims.

What is claimed is:

1. A harvester for a forestry machine, comprising grapple means for grasping a tree stem, a cutting tool for cutting off the tree stem, a limbing or trimming device for trimming the tree stem, advancement means for advancing the tree stem in an axial direction past the trimming device and the cutting tool, a first measurement means for measuring a length of the tree stem and a second measurement means for measuring how a transverse dimension of the tree stem varies along a length of the tree stem, said second measurement device including movable measurement means for contact-free detection of an outer contour of the tree stem, from which a diameter is calculable, and the second measurement means being located between the trimming device and the advancement means for counteracting dirtying of the second measurement device.

2. The harvester as claimed in claim 1, wherein the second measurement means is disposed beyond a gap counting from the tree stem for counteracting dirtying of the second measurement means.

3. The harvester as claimed in claim 1, wherein the second measurement means is disposed above the tree stem during the trimming operation for avoiding dirtying of the second measurement means.

4. The harvester as claimed in claim 1, wherein the second measurement means includes a processing unit for receiving positional indications from the movable measurement means on detection of the outer contour from which the diameter is calculable.

5. The harvester as claimed in claim 4, wherein the processing unit is operative to control the movements of the movable measurement means.

6. The harvester as claimed in claims 1, wherein the movable measurement means are movable in a direction substantially transversely directed in relation to the tree stem.

7. The harvester as claimed in claim 6, wherein the movable measurement means are movable in a direction at right angles to the tree stem.

8. The harvester as claimed in claim 1, wherein the movable measurement means are photocells.

9. The harvester as claimed in claim 1, wherein the movable measurement means are ultrasound devices.

* * * * *